United States Patent
Moriguchi (10) Patent No.: US 10,775,169 B2
(45) Date of Patent: Sep. 15, 2020

(54) VIBRATING STRUCTURE ANGULAR RATE SENSOR

(71) Applicant: Sumitomo Precision Products Co., Ltd., Amagasaki-shi, Hyogo (JP)

(72) Inventor: Takafumi Moriguchi, Amagasaki (JP)

(73) Assignee: Sumitomo Precision Products Co., Ltd., Amagasaki-shi (JP)

( * ) Notice: Subject to any disclaimer, the term of this patent is extended or adjusted under 35 U.S.C. 154(b) by 249 days.

(21) Appl. No.: 15/916,644

(22) Filed: Mar. 9, 2018

(65) Prior Publication Data

US 2018/0259334 A1    Sep. 13, 2018

(30) Foreign Application Priority Data

Mar. 10, 2017  (JP) ................................. 2017-046179

(51) Int. Cl.
*G01C 19/5677* (2012.01)
*G01C 19/5776* (2012.01)

(52) U.S. Cl.
CPC ..... *G01C 19/5677* (2013.01); *G01C 19/5776* (2013.01)

(58) Field of Classification Search
CPC .......................... G01C 19/5677; G01C 19/5776
USPC ........................................................ 73/504
See application file for complete search history.

(56) References Cited

U.S. PATENT DOCUMENTS

| | | | |
|---|---|---|---|
| 7,194,904 B2 | 3/2007 | Higuchi | |
| 8,347,718 B2 * | 1/2013 | Malvern | G01C 19/5677 73/504.12 |
| 10,082,404 B1 * | 9/2018 | Ge | G01C 25/005 |
| 2010/0263445 A1 * | 10/2010 | Hayner | G01C 19/56 73/504.12 |
| 2011/0192226 A1 * | 8/2011 | Hayner | G01C 19/5776 73/504.12 |
| 2016/0018243 A1 * | 1/2016 | Okon | G01C 19/5776 73/1.77 |
| 2016/0377433 A1 * | 12/2016 | Moriguchi | G01C 19/5677 73/504.12 |
| 2017/0343750 A1 * | 11/2017 | Ashrafi | H04B 10/516 |

FOREIGN PATENT DOCUMENTS

| | | |
|---|---|---|
| JP | 8-54238 A | 2/1996 |
| JP | H0854238 * | 2/1996 |
| JP | 11-201758 A | 7/1999 |
| JP | 2006-17624 A | 1/2006 |
| JP | 2012-159429 A | 8/2012 |
| WO | WO 2015/129464 A1 | 9/2015 |
| WO | WO-2015129464 A1 * | 9/2015 ......... G01C 19/5677 |

OTHER PUBLICATIONS

Translation JPH0854238 (Year: 1996).*

* cited by examiner

*Primary Examiner* — Peter J Macchiarolo
*Assistant Examiner* — Monica S Young
(74) *Attorney, Agent, or Firm* — Crowell & Moring LLP (57) ABSTRACT

In a vibrating structure angular rate sensor, a signal generator generates a phase change suppressing signal in which a phase change according to an amplitude of a rectangular wave signal generated by at least one of a first modulator and a second modulator is suppressed.

12 Claims, 4 Drawing Sheets

VIBRATING STRUCTURE ANGULAR RATE SENSOR

CROSS-REFERENCE TO RELATED APPLICATION

The priority application number JP2017-046179, Vibrating Structure Angular Rate Sensor, Mar. 10, 2017, Takafumi Moriguchi, upon which this patent application is based, is hereby incorporated by reference.

BACKGROUND OF THE INVENTION

Field of the Invention

The present invention relates to a vibrating structure angular rate sensor, and more particularly, it relates to a vibrating structure angular rate sensor including a closed-loop controller.

Description of the Background Art

A vibrating structure angular rate sensor including a closed-loop controller is known in general, as disclosed in International Publication No. WO2015/129464.

International Publication No. WO2015/129464 discloses a vibrating structure angular rate sensor including a primary-side control circuit including a closed control loop and a secondary-side control circuit including a closed control loop. In the vibrating structure angular rate sensor described in International Publication No. WO2015/129464, the primary-side control circuit vibrates (resonates) a resonator with a constant amplitude along one axial direction. In addition, the secondary-side control circuit applies a suppressing force (vibration) to the resonator so as to suppress a vibration generated in the resonator along another orthogonal axial direction to one axial direction due to a Coriolis force (angular rate). Then, this suppressing force is detected as an angular rate.

In the vibrating structure angular rate sensor described in International Publication No. WO2015/129464, a timing signal (clock signal) is generated with reference to an output signal from the resonator vibrated along one axial direction by a PLL circuit provided in the primary-side control circuit. Based on this timing signal, a rectangular wave (square wave) signal is generated by a modulation circuit provided in the primary-side control circuit, and due to this rectangular wave (square wave) signal, the resonator is driven (vibrated) with a constant amplitude.

The quality factor of the resonator changes depending on the temperature (ambient temperature) of the vibrating structure angular rate sensor or with time. Note that the quality factor means an amplitude ratio in the case where an external force of the same frequency as the natural frequency of the resonator is applied from the primary-side control circuit. In order to vibrate the resonator with a constant amplitude along one axial direction, it is necessary to change the amplitude of the rectangular wave (square wave) signal generated by the modulation circuit of the primary-side control circuit according to a change in the quality factor.

The rectangular wave signal generated by the modulation circuit is amplified by an amplifier included in a drive circuit and is transmitted to the resonator. When a signal having a fast rising speed (falling speed) such as the rectangular wave signal is input into the amplifier, the rising portion (falling portion) of the signal output from the amplifier has a slope (called a slew rate). That is, even when the rectangular wave signal is input into the amplifier, the signal output from the drive circuit has a substantially trapezoidal waveform not a rectangular waveform. Note that the rising slope and the falling slope of the substantially trapezoidal wave signal are substantially constant even if the amplitude of the substantially trapezoidal wave signal output from the drive circuit changes. Thus, the time it takes to reach the midpoint of the signal output (the point of ½ of the signal output) from the start of rising (the start of falling) of the signal varies with a change in the amplitude. Specifically, a substantially trapezoidal wave signal having a small amplitude reaches the midpoint in a relatively short time. On the other hand, a substantially trapezoidal wave signal having a large amplitude reaches the midpoint in a relatively long time. The fact that the time it takes to reach the midpoint of the signal output varies with a change in the amplitude means that the phase of the signal output from the drive circuit changes with a change in the amplitude. In this case, even when it is attempted to vibrate (drive) the resonator in a desired phase, the phase of the signal output from the drive circuit changes (shifts) such that the resonator cannot be controlled with high precision in some cases. Therefore, in recent years, high precision control of the resonator is desired.

SUMMARY OF THE INVENTION

The present invention has been proposed in order to solve the aforementioned problem, and an object of the present invention is to provide a vibrating structure angular rate sensor capable of controlling a resonator with high precision even when the amplitude of a signal for driving the resonator changes.

In order to attain the aforementioned object, a vibrating structure angular rate sensor according to a first aspect of the present invention includes a resonator, a first closed-loop controller including a first modulator that generates a rectangular wave signal and a first drive that generates a drive signal for driving the resonator based on the rectangular wave signal generated by the first modulator, a second closed-loop controller including a second modulator that generates a rectangular wave signal and a second drive that generates a drive signal for driving the resonator based on the rectangular wave signal generated by the second modulator, and a signal generator provided between at least one of (a) the first modulator and the first drive and (b) the second modulator and the second drive. The signal generator generates a phase change suppressing signal in which a phase change according to an amplitude of the rectangular wave signal generated by at least one of the first modulator and the second modulator is suppressed.

In the vibrating structure angular rate sensor according to the first aspect of the present invention, as hereinabove described, the signal generator generates the phase change suppressing signal in which a phase change according to the amplitude of the rectangular wave signal generated by at least one of the first modulator and the second modulator is suppressed. Thus, the phase change suppressing signal, in which a phase change according to the amplitude is suppressed, is input into at least one of the first drive and the second drive, and hence the phase of the drive signal output from at least one of the first drive and the second drive does not change according to the amplitude. Consequently, even when the amplitude of the drive signal for driving the resonator changes, the resonator can be controlled with high precision.

In the aforementioned vibrating structure angular rate sensor according to the first aspect, the first closed-loop controller preferably induces a primary vibration in the resonator, and the second closed-loop controller preferably detects a secondary vibration generated in the resonator due to an angular rate applied to the resonator. According to this structure, the signal generator is provided in the first closed-loop controller such that a change in the phase of the drive signal according to the amplitude is suppressed in the first closed-loop controller, and hence even when the temperature (quality factor) changes such that the amplitude of the drive signal for vibrating the resonator changes, the influence (cross coupling) of a change in the phase of the drive signal on the second closed-loop controller can be significantly reduced or prevented. Furthermore, the signal generator is provided in the second closed-loop controller such that a change in the phase of the drive signal according to the amplitude is suppressed in the second closed-loop controller, and hence even when the amplitude of the drive signal for detecting the secondary vibration changes, a reduction in the accuracy of detection of the secondary vibration due to the phase change can be suppressed.

In the aforementioned vibrating structure angular rate sensor according to the first aspect, the signal generator preferably generates the phase change suppressing signal having a triangular waveform based on the rectangular wave signal generated by at least one of the first modulator and the second modulator. When the amplitude of the phase change suppressing signal having the triangular waveform changes, the slope (change rate) from the start of rising (the start of falling) of the signal to the midpoint of the signal output (the point of ½ of the signal output) changes according to the amplitude, but the time it takes to reach the midpoint does not change. Unlike the rectangular wave signal, the rising portion (falling portion) of the phase change suppressing signal having the triangular waveform is originally sloped, and this slope is sufficiently smaller than the slew rate (the rising and falling slopes of the output signal) of an amplifier included in the first drive (second drive). Thus, even when the phase change suppressing signal having the triangular waveform is input into the first drive (second drive), there is no (or a sufficiently small) change in the waveform due to the amplifier, and the drive signal output from the first drive (second drive) has a characteristic that the phase does not change according to the amplitude. Therefore, the signal generator is configured to generate the phase change suppressing signal having the triangular waveform such that the resonator can be easily controlled with high precision even when the amplitude of the drive signal for vibrating the resonator changes.

In this case, the signal generator preferably includes an integrating circuit, and the integrating circuit preferably generates the phase change suppressing signal having the triangular waveform based on the rectangular wave signal. When the rectangular wave signal is input into the integrating circuit, the triangular wave signal is output, and hence the triangular wave signal can be easily generated by the integrating circuit with a relatively simple circuit configuration.

In the aforementioned vibrating structure angular rate sensor in which the signal generator includes the integrating circuit, the integrating circuit preferably receives the rectangular wave signal having a phase different by 90 degrees from a phase of the drive signal output from at least one of the first drive and the second drive. When the rectangular wave signal is input into the integrating circuit, the triangular wave signal having a phase different by 90 degrees from the phase of the rectangular wave signal is output. Therefore, the rectangular wave signal having a phase different by 90 degrees from the phase of the drive signal is input into the integrating circuit such that the triangular wave signal having the same phase as that in the case where no integrating circuit is provided can be output from at least one of the first drive and the second drive.

In the aforementioned vibrating structure angular rate sensor according to the first aspect, the signal generator is preferably provided both between the first modulator and the first drive and between the second modulator and the second drive. According to this structure, the resonator can be controlled with high precision in both the first closed-loop controller and the second closed-loop controller.

In this case, the signal generator preferably includes a first integrating circuit provided between the first modulator and the first drive and a second integrating circuit provided between the second modulator and the second drive and having a same signal generation characteristic as that of the first integrating circuit. According to this structure, the adverse influence of a non-uniformity between the characteristic (such as the phase) of the phase change suppressing signal output from the first integrating circuit and the characteristic (such as the phase) of the phase change suppressing signal output from the second integrating circuit can be significantly reduced or prevented. The term "same signal generation characteristic" means that signals having the same waveform are output when the signals having the same waveform are input into the first integrating circuit and the second integrating circuit.

In the aforementioned vibrating structure angular rate sensor in which the signal generator is provided both between the first modulator and the first drive and between the second modulator and the second drive, the first closed-loop controller provided with the signal generator preferably induces a primary vibration in the resonator, and the second closed-loop controller provided with the signal generator preferably detects a secondary vibration generated in the resonator due to an angular rate applied to the resonator and includes two closed loops using signals, phases of which are shifted from each other by 90 degrees. A signal output from the resonator includes a signal generated due to the secondary vibration generated due to the angular rate and an error signal proportional to the primary vibration generated due to the structural distortion of the resonator, for example. The phase of the signal generated due to the secondary vibration generated due to the angular rate and the phase of the error signal are shifted from each other by approximately 90 degrees. The signal generated due to the secondary vibration generated due to the angular rate is called a real component, and the error signal is called a quadrature component. The real component and the quadrature component are controlled independently of each other by the two closed loops such that the real component (angular rate detection signal) not influenced by the error signal can be extracted (quadrature correction can be performed). Therefore, when the rectangular wave signal, the phase of which changes according to the amplitude, is input into the second drive, the phase difference between the real component and the quadrature component deviates from 90 degrees, and the quadrature component leaks into the real component such that an error is caused in angular rate detection. Therefore, the phase change suppressing signal, in which a phase change according to the amplitude is suppressed, is generated by the signal generator such that leakage of the quadrature component into the real component is suppressed, and hence an error in angular rate detection can be reduced.

A vibrating structure angular rate sensor according to a second aspect of the present invention includes a resonator, a first closed-loop controller including a first modulator that generates a rectangular wave signal and a first drive that generates a drive signal for driving the resonator based on the rectangular wave signal generated by the first modulator and that induces a primary vibration in the resonator, a second closed-loop controller including a second modulator that generates a rectangular wave signal and a second drive that generates a drive signal for driving the resonator based on the rectangular wave signal generated by the second modulator and that detects a secondary vibration generated in the resonator due to an angular rate applied to the resonator, and a signal generator provided between at least (b) the second modulator and the second drive of (a) the first modulator and the first drive and (b) the second modulator and the second drive. The signal generator generates a phase change suppressing signal in which a phase change according to an amplitude of the rectangular wave signal generated by at least the second modulator of the first modulator and the second modulator is suppressed, and the second closed-loop controller provided with the signal generator includes two closed loops using signals, phases of which are shifted from each other by 90 degrees.

In the vibrating structure angular rate sensor according to the second aspect of the present invention, as hereinabove described, the signal generator generates the phase change suppressing signal in which a phase change according to the amplitude of the rectangular wave signal generated by at least the second modulator of the first modulator and the second modulator is suppressed. Thus, the phase change suppressing signal, in which a phase change according to the amplitude is suppressed, is input into at least the second drive of the first drive and the second drive, and hence the phase of the drive signal output from at least the second drive of the first drive and the second drive does not change according to the amplitude. Consequently, even when the amplitude of the drive signal for driving the resonator changes, the resonator can be controlled with high precision.

Furthermore, the signal generator is provided in the first closed-loop controller such that a change in the phase of the drive signal according to the amplitude is suppressed in the first closed-loop controller, and hence even when the temperature (quality factor) changes such that the amplitude of the drive signal for vibrating the resonator changes, the influence (cross coupling) of a change in the phase of the drive signal on the second closed-loop controller can be significantly reduced or prevented. In addition, the signal generator is provided in the second closed-loop controller such that a change in the phase of the drive signal according to the amplitude is suppressed in the second closed-loop controller, and hence even when the amplitude of the drive signal for detecting the secondary vibration changes, a reduction in the accuracy of detection of the secondary vibration due to the phase change can be suppressed.

A signal output from the resonator includes a signal generated due to the secondary vibration generated due to the angular rate and an error signal proportional to the primary vibration generated due to the structural distortion of the resonator, for example. The phase of the signal generated due to the secondary vibration generated due to the angular rate and the phase of the error signal are shifted from each other by approximately 90 degrees. The signal generated due to the secondary vibration generated due to the angular rate is called a real component, and the error signal is called a quadrature component. The real component and the quadrature component are controlled independently of each other by the two closed loops such that the real component (angular rate detection signal) not influenced by the error signal can be extracted (quadrature correction can be performed). Therefore, when the rectangular wave signal, the phase of which changes according to the amplitude, is input into the second drive, the phase difference between the real component and the quadrature component deviates from 90 degrees, and the quadrature component leaks into the real component such that an error is caused in angular rate detection. Therefore, the phase change suppressing signal, in which a phase change according to the amplitude is suppressed, is generated by the signal generator such that leakage of the quadrature component into the real component is suppressed, and hence an error in angular rate detection can be reduced.

In the aforementioned vibrating structure angular rate sensor according to the second aspect, the signal generator preferably generates the phase change suppressing signal having a triangular waveform based on the rectangular wave signal generated by at least the second modulator of the first modulator and the second modulator. When the amplitude of the phase change suppressing signal having the triangular waveform changes, the slope (change rate) from the start of rising (the start of falling) of the signal to the midpoint of the signal output (the point of ½ of the signal output) changes according to the amplitude, but the time it takes to reach the midpoint does not change. Unlike the rectangular wave signal, the rising portion (falling portion) of the phase change suppressing signal having the triangular waveform is originally sloped, and this slope is sufficiently smaller than the slew rate (the rising and falling slopes of the output signal) of an amplifier included in the first drive (second drive). Thus, even when the phase change suppressing signal having the triangular waveform is input into the first drive (second drive), there is no (or a sufficiently small) change in the waveform due to the amplifier, and the drive signal output from the first drive (second drive) has a characteristic that the phase does not change according to the amplitude. Therefore, the signal generator is configured to generate the phase change suppressing signal having the triangular waveform such that the resonator can be easily controlled with high precision even when the amplitude of the drive signal for vibrating the resonator changes.

In this case, the signal generator preferably includes an integrating circuit, and the integrating circuit preferably generates the phase change suppressing signal having the triangular waveform based on the rectangular wave signal. When the rectangular wave signal is input into the integrating circuit, the triangular wave signal is output, and hence the triangular wave signal can be easily generated by the integrating circuit with a relatively simple circuit configuration.

In the aforementioned vibrating structure angular rate sensor in which the signal generator includes the integrating circuit, the integrating circuit preferably receives the rectangular wave signal having a phase different by 90 degrees from a phase of the drive signal output from at least the second drive of the first drive and the second drive. When the rectangular wave signal is input into the integrating circuit, the triangular wave signal having a phase different by 90 degrees from the phase of the rectangular wave signal is output. Therefore, the rectangular wave signal having a phase different by 90 degrees from the phase of the drive signal is input into the integrating circuit such that the triangular wave signal having the same phase as that in the case where no integrating circuit is provided can be output from at least the second drive of the first drive and the second drive.

In the aforementioned vibrating structure angular rate sensor according to the second aspect, the signal generator is preferably provided both between the first modulator and the first drive and between the second modulator and the second drive. According to this structure, the resonator can be controlled with high precision in both the first closed-loop controller and the second closed-loop controller.

In this case, the signal generator preferably includes a first integrating circuit provided between the first modulator and the first drive and a second integrating circuit provided between the second modulator and the second drive and having a same signal generation characteristic as that of the first integrating circuit. According to this structure, the adverse influence of a non-uniformity between the characteristic (such as the phase) of the phase change suppressing signal output from the first integrating circuit and the characteristic (such as the phase) of the phase change suppressing signal output from the second integrating circuit can be significantly reduced or prevented. The term "same signal generation characteristic" means that signals having the same waveform are output when the signals having the same waveform are input into the first integrating circuit and the second integrating circuit.

According to the present invention, as described above, even when the amplitude of the signal for driving the resonator changes, the resonator can be controlled with high precision.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

The structure of a vibrating structure angular rate sensor 100 according to this embodiment is now described with reference to FIGS. 1 to 6.

Figure 1:
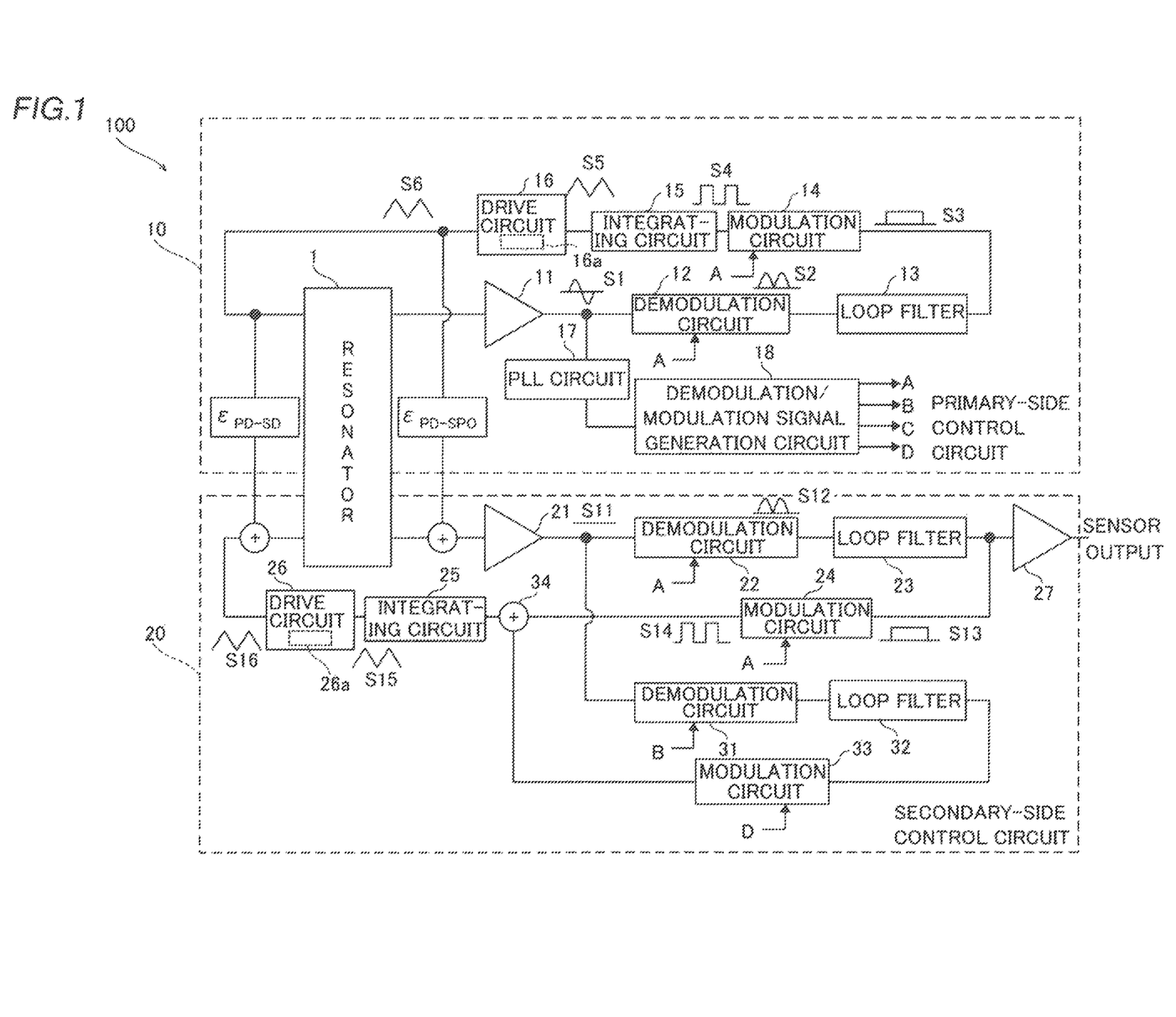
FIG. 1 is a block diagram showing the structure of a vibrating structure angular rate sensor according to an embodiment of the present invention.

As shown in FIG. 1, the vibrating structure angular rate sensor 100 includes a resonator 1. The resonator 1 is a ring-shaped resonator 1, for example.

The vibrating structure angular rate sensor 100 includes a primary-side control circuit 10. The primary-side control circuit 10 induces a primary vibration in the resonator 1. The primary-side control circuit 10 includes an amplifier circuit 11, a demodulation circuit 12, a loop filter 13, a modulation circuit 14, an integrating circuit 15, and a drive circuit 16. The modulation circuit 14 generates a rectangular wave signal S4. The drive circuit 16 drives the resonator 1 based on the rectangular wave signal S4 (specifically, a signal S5 described later) generated by the modulation circuit 14. The drive circuit 16 includes an amplifier 16a. The loop filter 13 is an integral filter, for example. The resonator 1, the amplifier circuit 11, the demodulation circuit 12, the loop filter 13, the modulation circuit 14, the integrating circuit 15, and the drive circuit 16 are connected to each other in this order, and constitute a closed control loop. The details of the integrating circuit 15 are described later. The primary-side control circuit 10 is an example of a "first closed-loop controller" in the claims. The modulation circuit 14 is an example of a "first modulator" in the claims. The integrating circuit 15 is an example of a "signal generator" or a "first integrating circuit" in the claims. The drive circuit 16 is an example of a "first drive" in the claims. The signal S4 is an example of a "rectangular wave signal" in the claims.

The primary-side control circuit 10 includes a PLL (Phase-Locked Loop) circuit 17 and a demodulation/modulation signal generation circuit 18. The demodulation/modulation signal generation circuit 18 generates a reference signal (a synchronization signal, a clock signal) by PLL control with reference to an output signal from the resonator 1 vibrated along one axial direction. Specifically, in the demodulation/modulation signal generation circuit 18, reference signals A to D are generated. The phases of the reference signals A to D are shifted from each other by 90 degrees. For example, when the phase of the reference signal A at a certain time is 0 degrees, the phase of the reference signal B is 90 degrees, the phase of the reference signal C is 180 degrees, and the phase of the reference signal D is 270 degrees.

The vibrating structure angular rate sensor 100 includes a secondary-side control circuit 20. The secondary-side control circuit 20 detects a secondary vibration generated in the resonator 1 due to an angular rate (Coriolis force) applied to the resonator 1. The secondary-side control circuit 20 includes an amplifier circuit 21, a demodulation circuit 22, a loop filter 23, a modulation circuit 24, an integrating circuit 25, and a drive circuit 26. The modulation circuit 24 generates a rectangular wave signal S14. The drive circuit 26 drives the resonator 1 based on the rectangular wave signal S14 (specifically, a signal S15 described later) generated by the modulation circuit 24. The drive circuit 26 includes an amplifier 26a. The loop filter 23 is an integral filter, for example. The resonator 1, the amplifier circuit 21, the demodulation circuit 22, the loop filter 23, the modulation circuit 24, the integrating circuit 25, and the drive circuit 26 are connected to each other in this order, and constitute a closed control loop. The details of the integrating circuit 25 are described later. The secondary-side control circuit 20 is an example of a "second closed-loop controller" in the claims. The modulation circuit 24 is an example of a "second modulator" in the claims. The integrating circuit 25 is an example of a "signal generator" or a "second integrating circuit" in the claims. The drive circuit 26 is an example of a "second drive" in the claims. The signal S14 is an example of a "rectangular wave signal" in the claims.

Figure 2:
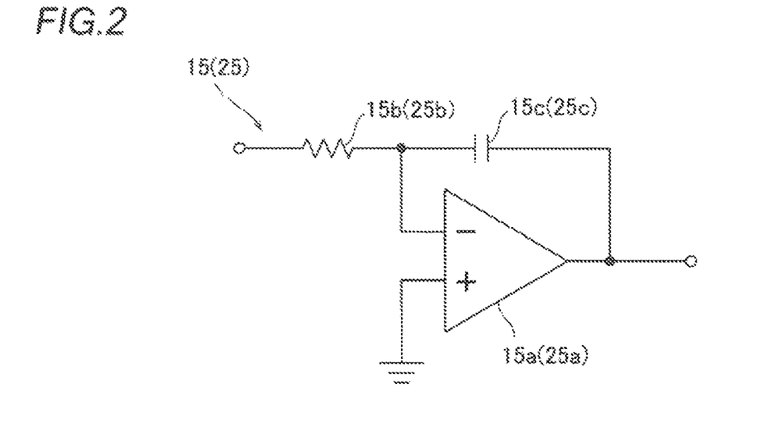
FIG. 2 is a circuit diagram of an integrating circuit.

Thus, according to this embodiment, the integrating circuit (15 and 25) is provided both between the modulation circuit 14 and the drive circuit 16 and between the modulation circuit 24 and the drive circuit 26. The signal generation characteristics of the integrating circuit 15 are the same as the signal generation characteristics of the integrating circuit 25. That is, when signals having the same waveform are input into the integrating circuit 15 and the integrating circuit 25, the integrating circuit 15 and the integrating circuit 25 output the signals having the same waveform. Specifically, as shown in FIG. 2, the integrating circuit 15 (integrating circuit 25) includes an operational amplifier 15a (25a), a resistor 15b (25b), a capacitor 15c (25c), etc. The characteristics of the operational amplifier 15a and the characteristics of the operational amplifier 25a are the same as each other, the resistance value of the resistor 15b and the resistance value of the resistor 25b are the same as each other, and the capacitance of the capacitor 15c and the capacitance of the capacitor 25c are the same as each other.

As shown in FIG. 1, the secondary-side control circuit 20 includes an amplifier circuit 27. The output of the loop filter 23 is input into the amplifier circuit 27. A signal output from the amplifier circuit 27 is output to the outside as the sensor output (angular rate detection signal) of the vibrating structure angular rate sensor 100.

The secondary-side control circuit 20 includes a demodulation circuit 31, a loop filter 32, a modulation circuit 33, and an adder circuit 34. The demodulation circuit 31, the loop filter 32, the modulation circuit 33, and the adder circuit 34 are connected to each other in this order. The demodulation circuit 31 is connected between the amplifier circuit 21 and the demodulation circuit 22. The adder circuit 34 is provided between the drive circuit 26 and the modulation circuit 24. That is, according to this embodiment, the secondary-side control circuit 20 includes two closed loops using rectangular wave signals, the phases of which are shifted from each other by 90 degrees. Specifically, the secondary-side control circuit 20 includes a closed loop (one closed loop) including the resonator 1, the amplifier circuit 21, the demodulation circuit 22, the loop filter 23, the modulation circuit 24, the adder circuit 34, the integrating circuit 25, and the drive circuit 26 and a closed loop (the other closed loop) including the resonator 1, the amplifier circuit 21, the demodulation circuit 31, the loop filter 32, the modulation circuit 33, the adder circuit 34, the integrating circuit 25, and the drive circuit 26. The modulation circuit 24 of one closed loop operates based on the reference signal A, and the modulation circuit 33 of the other closed loop operates based on the reference signal D, the phase of which is led by 90 degrees from that of the reference signal A. The demodulation circuit 22 of one closed loop operates based on the reference signal A, and the demodulation circuit 31 of the other closed loop operates based on the reference signal B, the phase of which is lagged by 90 degrees from that of the reference signal A.

A signal output from the resonator 1 includes a signal generated due to the secondary vibration generated due to the angular rate and an error signal proportional to the primary vibration generated due to the structural distortion of the resonator 1, for example. The phase of the signal generated due to the secondary vibration generated due to the angular rate and the phase of the error signal are shifted from each other by approximately 90 degrees. The signal generated due to the secondary vibration generated due to the angular rate is called a real component, and the error signal is called a quadrature component. The real component and the quadrature component are controlled independently of each other by one closed loop and another closed loop, respectively such that the real component (angular rate detection signal) not influenced by the error signal can be extracted (quadrature correction can be performed).

(Details of Integrating Circuit)

The functions etc. of the integrating circuit 15 and the integrating circuit 25 are now described in detail.

As shown in FIG. 1, in the primary-side control circuit 10, the signal output from the resonator 1 is amplified by the amplifier circuit 11 to be a signal S1. The signal S1 amplified by the amplifier circuit 11 has a sine waveform.

The signal S1 amplified by the amplifier circuit 11 is detected based on the reference signal A by the demodulation circuit 12 to be a signal S2. The demodulation circuit 12 operates based on the reference signal A. Thereafter, the signal S2 output from the demodulation circuit 12 is integrated by the loop filter 13 to be a signal S3 of a certain magnitude. Thereafter, based on the reference signal A, the signal S3 is converted into the rectangular wave signal S4 by the modulation circuit 14.

According to this embodiment, the integrating circuit 15 generates the signal S5 in which a phase change according to the amplitude of the rectangular wave signal S4 generated by the modulation circuit 14 is suppressed. Specifically, the integrating circuit 15 generates the triangular wave signal S5 based on the rectangular wave signal S4 generated by the modulation circuit 14. The signal S5 is an example of a "phase change suppressing signal" in the claims.

Figure 3A:
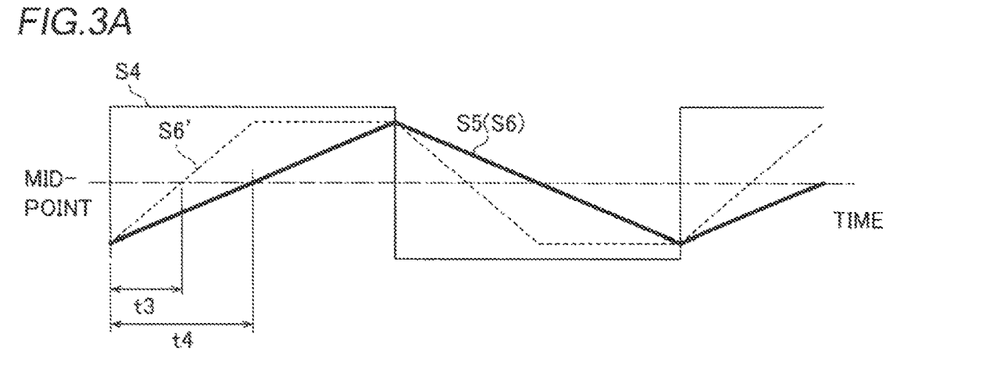
FIG. 3A is a diagram for illustrating a signal (in the case where the amplitude is large) of the vibrating structure angular rate sensor according to the embodiment of the present invention.
Figure 3B:
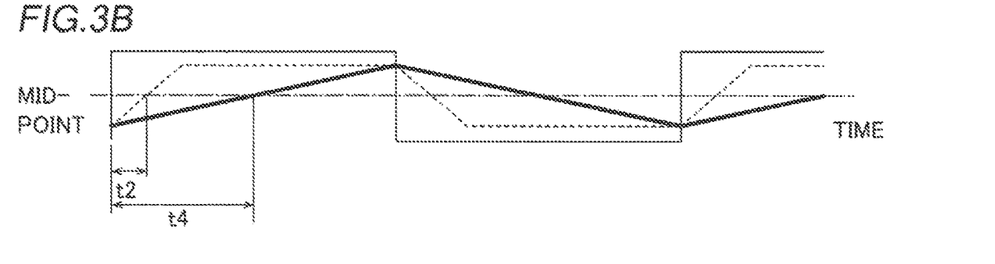
FIG. 3B is a diagram for illustrating a signal (in the case where the amplitude is medium) of the vibrating structure angular rate sensor according to the embodiment of the present invention.
Figure 3C:
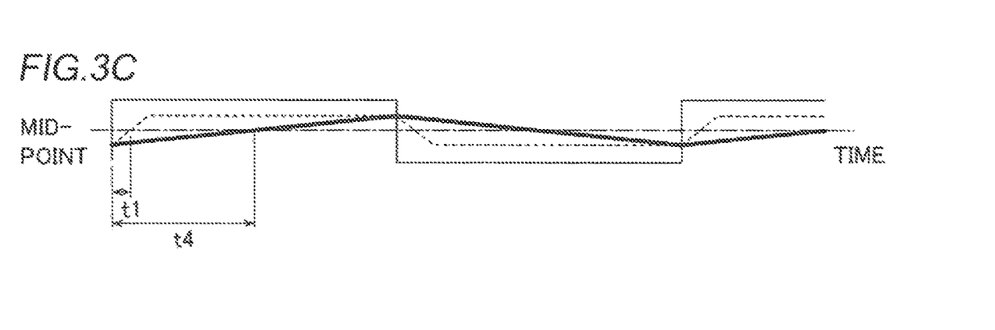
FIG. 3C is a diagram for illustrating a signal (in the case where the amplitude is small) of the vibrating structure angular rate sensor according to the embodiment of the present invention.

As shown in FIG. 3, when the rectangular wave signal S4 generated by the modulation circuit 14 is directly input into the drive circuit 16, due to the slew rate of the amplifier 16a included in the drive circuit 16, a signal S6' output from the drive circuit 16 has a substantially trapezoidal waveform (see a dotted line graph) not a rectangular waveform. The quality factor of the resonator 1 changes depending on the temperature of the resonator 1. Specifically, when the temperature is high, the quality factor decreases, and when the temperature is low, the quality factor increases. Therefore, in order to vibrate the resonator 1 with a constant amplitude of motion, it is necessary to apply a relatively large energy to the resonator 1 when the temperature is high. That is, the amplitude of the signal S6' for vibrating the resonator 1 increases. Incidentally, the rising slope and the falling slope of the substantially trapezoidal wave signal S6' are substantially constant even if the amplitude of a rectangular (substantially trapezoidal) wave signal output from the drive circuit 16 changes. Thus, the time it takes to reach the midpoint of the signal output (the point of ½ of the signal output) from the start of rising (the start of falling) of the signal varies with a change in the amplitude. For example, when the amplitude is small (see FIG. 3C), the signal reaches the midpoint of the signal output in a time t1, when the amplitude is medium (see FIG. 3B), the signal reaches the midpoint of the signal output in a time t2 longer than the time t1, and when the amplitude is large (see FIG. 3A), the signal reaches the midpoint of the signal output in a time t3 longer than the time t2. That is, the phase of the signal S6' output from the drive circuit 16 changes with a change in the amplitude. In this case, even when it is attempted to vibrate the resonator 1 in a desired phase, the phase of the signal output from the drive circuit changes (shifts) such that the resonator 1 cannot be controlled with high precision in some cases.

In the above description, it is assumed that the rising slope and the falling slope of the substantially trapezoidal wave signal S6' (the output of the amplifier 16a included in the drive circuit 16) are substantially constant even when the amplitude changes, but actually, the output characteristics of the amplifier 16a are temperature-dependent (see FIG. 4 described later). Therefore, a change in the phase delay is more complicated. A change in the output (level) of the amplifier 16a is also dependent on the temperature characteristics of the quality factor of the resonator 1. The temperature characteristics of the quality factor of the resonator 1 are different from the temperature dependence (temperature characteristics) of the output of the amplifier 16a. That is, there is a difference between the temperature followability (follow-up speed) of the resonator 1 with respect to an ambient temperature change and the temperature followability (follow-up speed) of the amplifier 16a with respect to the ambient temperature change, and hence it is difficult to correct the output of the amplifier 16a for a temperature change.

Figure 4:
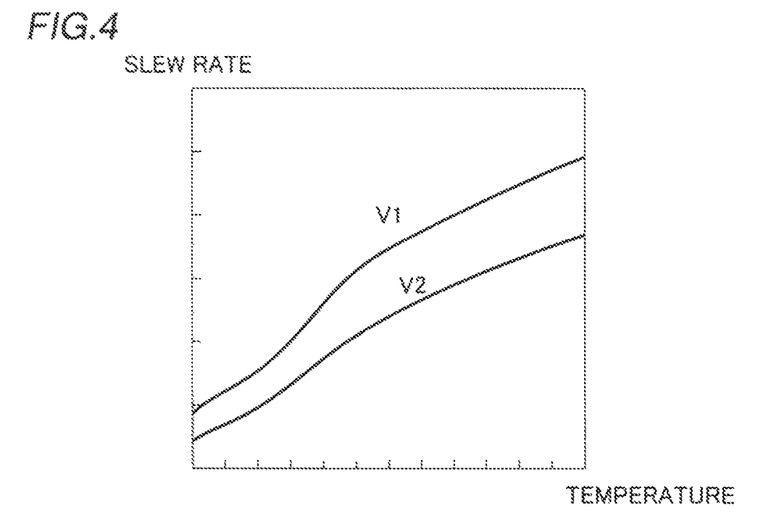
FIG. 4 is a diagram showing the slew rate of an amplifier.

FIG. 4 shows changes in the slew rate of the amplifier 16a with respect to the ambient temperature of the amplifier 16a. Note that V1 and V2 (<V1) represent voltages input into the amplifier 16a. As shown in FIG. 4, the slew rate of the amplifier 16a increases as the ambient temperature increases.

As shown in FIG. 3, in the case of the triangular wave signal S5 (thick solid line) output from the integrating circuit 15, even when the amplitude of the triangular wave signal S5 changes, a time (t4) to the midpoint does not change although the slope (change rate) from the start of rising (the start of falling) of the signal S5 to the midpoint of the signal output changes according to the amplitude. The rising portion (falling portion) of the triangular wave signal S5 is originally sloped unlike the rectangular wave signal S4, and hence even when the triangular wave signal S5 is input into the drive circuit 16, there is no (or a small) change in the waveform due to the amplifier 16a, and the signal S6 (thick solid line) output from the drive circuit 16 has a characteristic that the phase does not change according to the amplitude. Thus, even when the amplitude of the signal S6 changes, the phase does not shift, and hence the resonator 1 can be controlled with high precision. The signal S6 is an example of a "drive signal" in the claims.

According to this embodiment, as shown in FIG. 1, the integrating circuit 15 receives the signal S4 having a phase different from the phase of the signal S6 output from the drive circuit 16 by 90 degrees. When the rectangular wave signal S4 is input from the modulation circuit 14 into the integrating circuit 15, the triangular wave signal S5 having a phase lagged by 90 degrees from the phase of the rectangular wave signal S4 is output. That is, the integrating circuit 15 is provided between the drive circuit 16 and the modulation circuit 14 such that the phase of the signal S5 input into the drive circuit 16 is lagged by 90 degrees. Therefore, the signal S4 having a phase led by 90 degrees (the phase of the reference signal A instead of the reference signal B) is input into the modulation circuit 24 such that the signal S5 having the phase of the reference signal B is generated from the integrating circuit 15. Thus, the phase (the phase of the reference signal B) of the signal S6 output from the drive circuit 16 is the same as that in the case where no integrating circuit 15 is provided.

Also in the secondary-side control circuit 20, the signal output from the resonator 1 is amplified by the amplifier circuit 21 to be a signal S11, similarly to the primary-side control circuit 10. The signal S11 amplified by the amplifier circuit 21 is substantially zero due to closed-loop control (feedback control). The signal S11 is input into the demodulation circuit 22. The demodulation circuit 22 operates based on the reference signal A, for example. A signal S12 output from the demodulation circuit 22 is integrated by the loop filter 23 to be a signal S13 of a certain magnitude. Thereafter, the signal S13 is converted into the rectangular wave signal S14 by the modulation circuit 24. The modulation circuit 24 operates based on the reference signal A. The output of the loop filter 23 is output to the outside as the sensor output of the vibrating structure angular rate sensor 100 through the amplifier circuit 27.

According to this embodiment, the integrating circuit 25 generates the triangular wave signal S15 in which a phase change according to the amplitude of the rectangular wave signal S14 generated by the modulation circuit 24 is suppressed. The signal S15 is an example of a "phase change suppressing signal" in the claims.

According to this embodiment, the integrating circuit 25 receives the signal S14 having a phase (the phase of the reference signal A) different from the phase (the phase of the reference signal B) of a signal S16 output from the drive circuit 26 by 90 degrees. Specifically, similarly to the primary-side control circuit 10, the modulation circuit 24 performs modulation based on the signal S14 (the reference signal A instead of the reference signal B) having a phase led by 90 degrees. Thus, the phase (the phase of the reference signal B) of the signal S16 output from the drive circuit 26 is the same as that in the case where no integrating circuit 25 is provided. The signal S16 is an example of a "drive signal" in the claims.

In the relatively small resonator 1, an electrode that drives the resonator 1 along a first axis, an electrode that detects a vibration along the first axis, an electrode that drives the resonator 1 along a second axis, and an electrode that detects a vibration along the second axis (a total of four electrodes) are adjacent to each other, and hence capacitive coupling (cross coupling) occurs inside the resonator 1. In addition to the cross coupling in the resonator 1, the primary-side control circuit 10 and the secondary-side control circuit 20 are disposed relatively adjacent to each other, and hence capacitive coupling (cross coupling) occurs between the primary-side control circuit 10 and the secondary-side control circuit 20. Specifically, capacitive coupling ($\varepsilon_{PD-SD}$) occurs on the input side of the resonator 1, and capacitive coupling ($\varepsilon_{PD-SPO}$) occurs also on the output side of the resonator 1. Thus, whereas the capacitive coupling influences the sensor output of the vibrating structure angular rate sensor 100, the integrating circuit 25 is provided such that the influence of the phase shifting is significantly reduced or prevented, and hence the influence of the phase shifting is not added (mixed) to the influence of the capacitive coupling.

Figure 5:
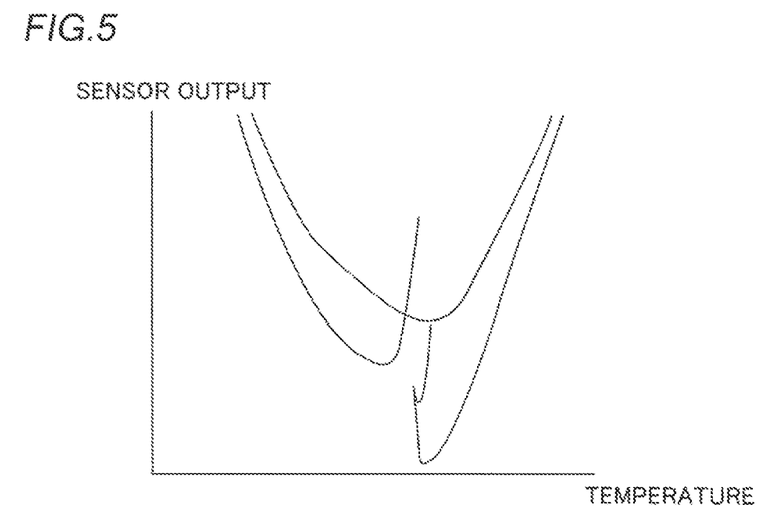
FIG. 5 is a diagram showing a sensor output in the case where no integrating circuit is provided.
Figure 6:
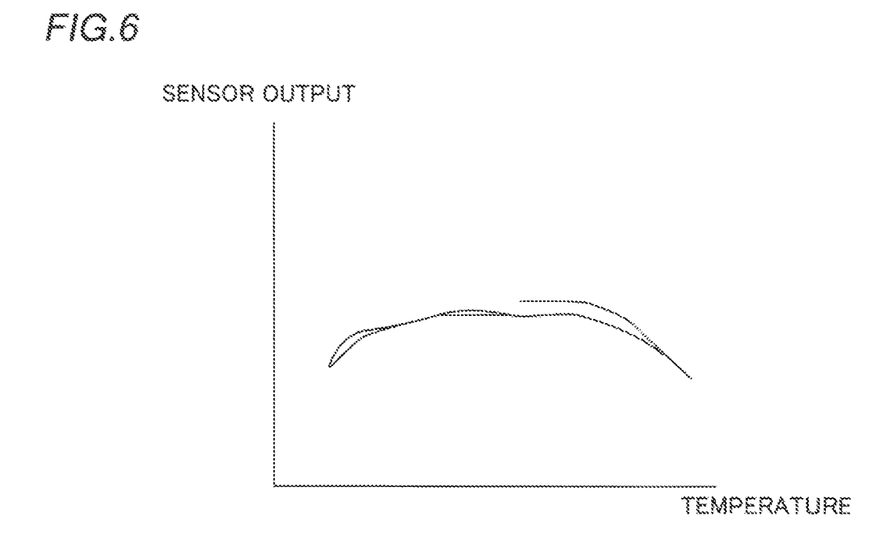
FIG. 6 is a diagram showing a sensor output in the case where the integrating circuit is provided.

An experiment conducted on the effect of the case where the integrating circuit 15 and the integrating circuit 25 are provided is now described with reference to FIGS. 5 and 6. FIGS. 5 and 6 schematically show the experimental results, and highlight hysteresis described later.

FIG. 5 shows the sensor output of the vibrating structure angular rate sensor 100 with respect to the temperature in the case where the integrating circuit 15 and the integrating circuit 25 are not provided (in the case where the drive circuit 16 and the drive circuit 26 are driven due to a rectangular wave signal). As shown in FIG. 5, it has been confirmed that the sensor output value is different (hysteresis) at the same temperature when the ambient temperature is gradually increased and then the temperature is gradually decreased. The hysteresis occurs for the following reasons. The dominant factor of the temperature characteristics of the real component as the sensor output is the temperature characteristics of the quality factor of the resonator 1. The dominant factor of the temperature characteristics of the quadrature component is obtained by adding variations in structural distortion due to temperature changes to the temperature characteristics of the quality factor of the resonator 1, and the followability to follow these two temperature changes (the temperature change of the quality factor and the temperature change of the structural distortion) is different, and hence the quadrature component has hysteresis. This hysteresis of the quadrature component leaks into the real component due to the phase shifting such that hysteresis occurs also in the sensor output. On the other hand, as shown in FIG. 6, it has been confirmed that the hysteresis of the sensor output is reduced when the integrating circuit 15 and the integrating circuit 25 are provided (when the drive circuit 16 and the drive circuit 26 are driven due to a triangular wave signal).

Effects of Embodiment

According to this embodiment, the following effects can be obtained.

According to this embodiment, as hereinabove described, the integrating circuit 15 that generates the signal S5, in which a phase change according to the amplitude of the rectangular wave signal S4 generated by the modulation circuit 14 is suppressed, is provided between the modulation circuit 14 and the drive circuit 16. Furthermore, the integrating circuit 25 that generates the signal S15, in which a phase change according to the amplitude of the rectangular wave signal S14 generated by the modulation circuit 24 is suppressed, is provided between the modulation circuit 24 and the drive circuit 26. Thus, the signal S5 (signal S15), the phase of which does not change according to the amplitude even through the drive circuit 16 (drive circuit 26), is input into the drive circuit 16 (drive circuit 26), and hence the phase of the signal S6 (signal S16) output from the drive circuit 16 (drive circuit 26) does not change according to the amplitude. Consequently, even when the amplitude of the signal S6 (signal S16) for driving the resonator 1 changes, the resonator 1 can be controlled with high precision.

According to this embodiment, as hereinabove described, the primary-side control circuit 10 induces the primary vibration in the resonator 1, and the secondary-side control circuit 20 detects the secondary vibration generated in the resonator 1 due to the angular rate applied to the resonator 1. Thus, the integrating circuit 15 provided in the primary-side control circuit 10 suppresses a change in the phase of the signal S6 according to the amplitude in the primary-side control circuit 10, and hence even when the temperature (quality factor) changes such that the amplitude of the signal S6 for vibrating the resonator 1 changes, the influence (cross coupling) of a change in the phase of the signal S6 on the secondary-side control circuit 20 can be significantly reduced or prevented. Furthermore, the integrating circuit 25 of the secondary-side control circuit 20 suppresses a change in the phase of the signal S16 according to the amplitude in the secondary-side control circuit 20, and hence even when the amplitude of the signal S16 for detecting the secondary vibration changes, a reduction in the accuracy of detection of the secondary vibration due to the phase change can be suppressed.

According to this embodiment, as hereinabove described, the integrating circuit 15 (integrating circuit 25) generates the triangular wave signal S5 (signal S15) based on the rectangular wave signal S4 (signal S14) generated by the modulation circuit 14 (modulation circuit 24). When the amplitude of the triangular wave signal S5 (signal S15) changes, the slope (change rate) from the start of rising (the start of falling) of the signal to the midpoint of the signal output (the point of ½ of the signal output) changes according to the amplitude, but the time it takes to reach the midpoint does not change. Unlike the rectangular wave signal S4 (signal S14), the rising portion (falling portion) of the triangular wave signal S5 (signal S15) is originally sloped, and this slope is sufficiently smaller than the slew rate (the rising and falling slopes of the output signal) of the amplifier 16a (amplifier 26a) included in the drive circuit 16 (drive circuit 26). Thus, even when the triangular wave signal S5 (signal S15) is input into the drive circuit 16 (drive circuit 26), there is no (or a sufficiently small) change in the waveform due to the amplifier 16a (amplifier 26a), and the signal S6 (signal S16) output from the drive circuit 16 (drive circuit 26) has a characteristic that the phase does not change according to the amplitude. Therefore, the integrating circuit 15 (integrating circuit 25) is configured to generate the triangular wave signal S5 (signal S15) such that the resonator 1 can be easily controlled with high precision even when the amplitude of the signal S6 (signal S16) for vibrating the resonator 1 changes.

According to this embodiment, as hereinabove described, the integrating circuit 15 (integrating circuit 25) generates the triangular wave signal S5 (signal S15) based on the rectangular wave signal S4 (signal S14). When the rectangular wave signal is input into the integrating circuit 15 (integrating circuit 25), the triangular wave signal is output, and hence the triangular wave signal can be easily generated by the integrating circuit 15 (integrating circuit 25) with a relatively simple circuit configuration.

According to this embodiment, as hereinabove described, the integrating circuit 15 (integrating circuit 25) receives the signal S4 (signal S14) having a phase different by 90 degrees from the phase of the signal S6 (signal S16) output from the drive circuit 16 (drive circuit 26). When the rectangular wave signal is input into the integrating circuit 15 (integrating circuit 25), the triangular wave signal having a phase different by 90 degrees from the phase of the rectangular wave signal is output. Therefore, the signal S4 (signal S14) having a phase different by 90 degrees from the phase of the signal S6 (signal S16) is input into the integrating circuit 15 (integrating circuit 25) such that the triangular wave signal having the same phase as that in the case where no integrating circuit 15 (integrating circuit 25) is provided can be output from the drive circuit 16 (drive circuit 26).

According to this embodiment, as hereinabove described, the integrating circuit (15 and 25) is provided both between the modulation circuit 14 and the drive circuit 16 and between the modulation circuit 24 and the drive circuit 26. Thus, the resonator 1 can be controlled with high precision in both the primary-side control circuit 10 and the secondary-side control circuit 20.

According to this embodiment, as hereinabove described, the integrating circuit 15 and the integrating circuit 25 have the same signal generation characteristics. Thus, the adverse influence of non-uniformities between the characteristics (such as the phase) of the signal S5 output from the integrating circuit 15 and the characteristics (such as the phase) of the signal S15 output from the integrating circuit 25 can be significantly reduced or prevented.

According to this embodiment, as hereinabove described, the secondary-side control circuit 20 includes the two closed loops using the signals, the phases of which are shifted from each other by 90 degrees. When the rectangular wave signal, the phase of which changes according to the amplitude, is input into the drive circuit 26, the phase difference between the real component and the quadrature component deviates from 90 degrees, and the quadrature component leaks into the real component such that an error is caused in angular rate detection. Therefore, the signal S5 (signal S15), in which a phase change according to the amplitude is suppressed, is generated by the integrating circuit 15 (integrating circuit 25) such that leakage of the quadrature component into the real component is suppressed, and hence an error in angular rate detection can be reduced.

(Modifications)

The embodiment disclosed this time must be considered as illustrative in all points and not restrictive. The range of the present invention is shown not by the above description of the embodiment but by the scope of claims for patent, and all modifications within the meaning and range equivalent to the scope of claims for patent are further included.

For example, while the ring-shaped resonator is used in the aforementioned embodiment, the present invention is not restricted to this. For example, a disk-shaped, cup-shaped (wineglass-shaped), octagon-shaped, or tuning fork resonator may alternatively be used.

While the triangular wave signal is input into the drive circuit in the aforementioned embodiment, the present invention is not restricted to this. For example, a signal, the phase of which does not change according to the amplitude, may alternatively be output from the drive circuit by digitally adjusting the phase of the signal output from the drive circuit.

While the integrating circuit generates the triangular wave signal based on the rectangular wave signal in the aforementioned embodiment, the present invention is not restricted to this. For example, the triangular wave signal may alternatively be generated based on the rectangular wave signal by a circuit other than the integrating circuit.

While the integrating circuit is provided in both the primary-side control circuit and the secondary-side control circuit in the aforementioned embodiment, the present invention is not restricted to this. For example, the integrating circuit may alternatively be provided only in one of the primary-side control circuit and the secondary-side control circuit. Thus, in one of the primary-side control circuit and the secondary-side control circuit, the resonator can be vibrated with high precision.

While the secondary-side control circuit includes the two closed loops using the signals, the phase of which are shifted from each other by 90 degrees, in the aforementioned embodiment, the present invention is not restricted to this. The present invention is also applicable to a vibrating structure angular rate sensor in which a secondary-side control circuit includes one closed loop.

While the primary-side control circuit induces the primary vibration in the resonator in the aforementioned embodiment, the present invention is not restricted to this. The present invention is also applicable to a vibrating structure angular rate sensor in which both a primary-side control circuit and a secondary-side control circuit induce a primary vibration in a resonator.

What is claimed is:

1. A vibrating structure angular rate sensor comprising:
   a resonator;
   a first closed-loop controller that induces a primary vibration in the resonator, including:
   a first modulator that generates a rectangular wave signal and
   a first drive that generates a drive signal for driving the resonator based on the rectangular wave signal generated by the first modulator;
   a second closed-loop controller that detects a secondary vibration generated in the resonator due to an angular rate applied to the resonator, including:
   a second modulator that generates a rectangular wave signal and
   a second drive that generates a drive signal for driving the resonator based on the rectangular wave signal generated by the second modulator;
   two closed loop circuits, each of which operates on signals having phases that are shifted from each other by 90 degrees; and
   a signal generator provided between at least one of (a) the first modulator and the first drive and (b) the second modulator and the second drive, wherein
   the signal generator generates a phase change suppressing signal based on the rectangular wave signal generated by one or more of the first and second modulators, wherein
   a phase change of the phase change suppressing signal is suppressed according to an amplitude of the rectangular wave signal.

2. The vibrating structure angular rate sensor according to claim 1, wherein
   the signal generator generates the phase change suppressing signal having a triangular waveform based on the rectangular wave signal generated by at least one of the first modulator and the second modulator.

3. The vibrating structure angular rate sensor according to claim 2, wherein
   the signal generator includes an integrating circuit, and
   the integrating circuit generates the phase change suppressing signal having the triangular waveform based on the rectangular wave signal.

4. The vibrating structure angular rate sensor according to claim 3, wherein
   the integrating circuit receives the rectangular wave signal having a phase different by 90 degrees from a phase of the drive signal output from at least one of the first drive and the second drive.

5. The vibrating structure angular rate sensor according to claim 1, wherein
   the signal generator is provided both between the first modulator and the first drive and between the second modulator and the second drive.

6. The vibrating structure angular rate sensor according to claim 5, wherein
   the signal generator includes a first integrating circuit provided between the first modulator and the first drive and a second integrating circuit provided between the second modulator and the second drive and having a same signal generation characteristic as that of the first integrating circuit.

7. A vibrating structure angular rate sensor comprising:
   a resonator;
   a first closed-loop controller including:
   a first modulator that generates a rectangular wave signal and
   a first drive that generates a drive signal for driving the resonator based on the rectangular wave signal generated by the first modulator, the first closed-loop controller that induces a primary vibration in the resonator;

a second closed-loop controller including:
  a second modulator that generates a rectangular wave signal and
  a second drive that generates a drive signal for driving the resonator based on the rectangular wave signal generated by the second modulator, the second closed-loop controller that detects a secondary vibration generated in the resonator due to an angular rate applied to the resonator; and
a signal generator provided between at least one of (a) the first modulator and the first drive and (b) the second modulator and the second drive, wherein
the signal generator generates a phase change suppressing signal based on the rectangular wave signal generated by one or more of the first and second modulators, wherein
  a phase change of the phase change suppressing signal is suppressed and
the second closed-loop controller provided with the signal generator includes two closed loop circuits, each of which operates based on signals having phases that are shifted from each other by 90 degrees.

8. The vibrating structure angular rate sensor according to claim 7, wherein
the signal generator generates the phase change suppressing signal having a triangular waveform based on the rectangular wave signal generated by at least one of the first modulator and the second modulator.

9. The vibrating structure angular rate sensor according to claim 8, wherein
the signal generator includes an integrating circuit, and
the integrating circuit generates the phase change suppressing signal having the triangular waveform based on the rectangular wave signal.

10. The vibrating structure angular rate sensor according to claim 9, wherein
the integrating circuit receives the rectangular wave signal having a phase different by 90 degrees from a phase of the drive signal output from at least one of the first drive and the second drive.

11. The vibrating structure angular rate sensor according to claim 7, wherein
the signal generator is provided both between the first modulator and the first drive and between the second modulator and the second drive.

12. The vibrating structure angular rate sensor according to claim 11, wherein
the signal generator includes a first integrating circuit provided between the first modulator and the first drive and a second integrating circuit provided between the second modulator and the second drive and having a same signal generation characteristic as that of the first integrating circuit.

* * * * *